United States Patent

Dahl et al.

[11] Patent Number: 5,991,757
[45] Date of Patent: Nov. 23, 1999

[54] METHOD AND SYSTEM FOR SEARCHING AN ARRAY FOR AN ARRAY VALUE

[75] Inventors: Stephen A. Dahl; John C. Endicott; Peter J. Heyrman; R. Karl Kirkman; Richard G. Mustain; Jon H. Peterson, all of Rochester, Minn.

[73] Assignee: International Business Machines Corporation, Armonk, N.Y.

[21] Appl. No.: 09/052,477

[22] Filed: Mar. 31, 1998

Related U.S. Application Data

[62] Division of application No. 08/526,611, Sep. 11, 1995.

[51] Int. Cl.[6] ..................................... G06F 9/455
[52] U.S. Cl. ...................... 707/3; 707/100; 395/500.47
[58] Field of Search ............................ 395/500; 707/100, 707/3

[56] References Cited

U.S. PATENT DOCUMENTS

| | | |
|---|---|---|
| 4,638,423 | 1/1987 | Ballard . |
| 4,839,797 | 6/1989 | Katori et al. . |
| 4,841,476 | 6/1989 | Mitchell et al. . |
| 5,226,164 | 7/1993 | Nadas et al. . |
| 5,280,593 | 1/1994 | Bullions, III et al. . |
| 5,317,754 | 5/1994 | Blandy et al. . |
| 5,408,624 | 4/1995 | Raasch et al. . |
| 5,819,063 | 10/1998 | Dahl et al. ............................. 395/500 |

OTHER PUBLICATIONS

Knuth, "The Art of Computer Programming: vol. 3, Searching and Sorting," Second Edition, ISBN 0–201–89685–0, pp. 409–426, 1998.

*Primary Examiner*—Kevin J. Teska
*Assistant Examiner*—Samuel Broda
*Attorney, Agent, or Firm*—Brian F. Russell; Andrew J. Dillon

[57] ABSTRACT

A data processing system includes at least one processor and data storage containing an array including N records having value-ordered entries. To find an entry matching a search value, W, a number of records to be searched, is set equal to N, and each of the W records is assigned to either a first set or a second set, where the first set includes X/2 of the W records and X is a smallest power of 2 equal to or greater than W. In response to a determination that the search value precedes the first record within the second set, a binary search of the first set of records is performed to identify a record including an matching entry. If the first entry of the first record within the second set matches the search value, the first record within the second set is identified. However, if the search value follows the first entry of the first record of the second set, the selected record is identified as containing an entry matching the search value only if W is equal to 1, and if W is not equal to 1, W is reset equal to a number of records within the second set and the above steps are repeated until a record containing a matching entry is identified. Following identification of the search value, at least one entry is retrieved from the identified record and contents of the at least one entry are processed within a processor.

11 Claims, 11 Drawing Sheets

| | 0 | 1 | 2 | 3 |
|---|---|---|---|---|
| ADDRESS HANDLERS | 0 | 1 | 2 | 3 |
| | 4 | 5 | 6 | 7 |
| | 8 | 9 | A | B |
| | C | D | E | F |
| INSTRUCTION HANDLERS | * X0 (Z0) | * X1 | * X2 (Z2) | * X3 |
| | X4 | X5 | X6 | X7 |
| | X8 | * X9 | XA | XB |
| | XC | XD | XE | XF |
| | * y0 | * y1 | * y2 | * y3 |
| | y4 | y5 | y6 | y7 |
| | y8 | y9 | yA | yB |
| | yC | yD | yE | yF |
| | f0 | f1 | f2 | * f3 |
| | f4 | f5 | f6 | * f7 |
| | * f8 | * f9 | * fA | * fB |
| | fC | * fD | fE | * fF |

\*- indicates an invalid instruction

*Fig. 5*

METHOD AND SYSTEM FOR SEARCHING AN ARRAY FOR AN ARRAY VALUE

This is a continuation, Division of application Ser. No. 08/526,611, filed Sep. 11, 1995 currently pending.

BACKGROUND OF THE INVENTION

1. Technical Field

The present invention relates in general to a method and system for data processing, and in particular to a data processing system and method for emulating a program. Still more particularly, the present invention relates to a data processing system and method which execute programs by emulation directly out of an emulated backing store to minimize emulation overhead.

2. Description of the Related Art

To minimize software development costs, it is often advantageous to make improvements to data processing system architecture backwards compatible, thereby enabling existing software to run on an enhanced data processing system with little or no modification. However, as technology advances, further enhancements of prior architectures are often inadequate to meet current performance requirements. In that case, new architectures are developed which utilize a different address space, addressing scheme, instruction set, etc., than prior architectures. Because of these architectural differences, software libraries utilized by prior architectures cannot be executed directly by a data processing system employing the new architecture, but can be executed only by emulation.

A typical emulator includes a number of instruction handler routines which each correspond to one instruction within the instruction set of the emulated architecture. To execute a program designed to execute within the emulated architecture, a data processing system maps selected aspects of the emulated architecture, for example, address space, virtual memory page size, and user registers, to corresponding resources within the data processing system and executes instruction handler routines corresponding to each instruction within the program.

Although emulation permits programs written for a prior architecture to be executed within a state-of-the-art data processing system, the processing overhead required to emulate a prior architecture can degrade the performance of a data processing system to such an extent that the software development costs saved by emulating existing software are insignificant compared with the performance penalty incurred. For example, in a typical emulation, the addressing scheme of the emulated architecture and the data processing system are different. Therefore, the address of each instruction and its associated operands must be translated before the instruction can be emulated. The translation overhead for operands is particularly high when emulating instructions such as "store multiple" which access numerous addresses. In addition, when emulating a data processing system which utilizes a virtual address space, the DASD and main store address spaces are typically simulated separately. Thus, when an emulated program requires a new page of virtual memory to be paged in, in addition to retrieving the required page from the backing store, the emulator must transfer the data residing within the virtual page from the simulated DASD to the simulated main store, as would be performed in hardware by the emulated system. Furthermore, during normal execution of a program, a processor typically prefetches instructions that are likely to be executed in order to minimize instruction latency. However, when emulating a system which supports reetrant programming, an instruction handler routine is typically fetched only after the completion of the instruction handler routine utilized to emulate the previous instruction. Fetching is serialized in this manner during emulation since the emulation of a program instruction could possibly modify the following program instruction, thereby changing which instruction handler routine should be fetched.

As is apparent from the foregoing description, it would be desirable to provide an improved data processing system and method which minimize the processing overhead required to emulate a second data processing system. In particular, it would be desirable to provide an improved method of storing, fetching, and executing emulated instructions within a data processing system.

SUMMARY OF THE INVENTION

It is therefore one object of the present invention to provide an improved method and system for data processing.

It is another object of the present invention to provide an improved data processing system and method for emulating a program.

It is yet another object of the present invention to provide an improved data processing system and method which execute programs by emulation directly out of a emulated backing store to minimize emulation overhead.

The foregoing objects are achieved as is now described. A method and data processing system for emulating a program are disclosed. According to the present invention, the data processing system runs under a first operating system and emulates the execution of a program under a second operating system within a second data processing system. The data processing system includes a memory which stores at least a portion of the first operating system and an emulator comprising a plurality of routines which each emulate an instruction utilized by the first operating system. The memory further includes a simulated mass storage data area which stores at least a portion of the program and a simulated main memory data area. The data processing system further includes a processor which executes instructions within the program under the first operating system by emulation. According to the present invention, the emulator accesses instructions of the program directly from the simulated mass storage data area to minimize emulation overhead. According to a second aspect of the present invention, the data processing system further includes a cache memory comprising a number of cache lines. The routines are stored within main memory such that when the routines are mapped into the cache, a first instruction within each of the emulation routines is aligned with a different one of the cache lines. According to a third aspect of the present invention, when executing instructions within a routine of a first emulated instruction, the processor prefetches a second emulated instruction prior to completion of the first emulated instruction.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a chart depicting the instruction set of the data processing system illustrated in FIG. 3;

FIG. 5 illustrates a pictorial representation of an instruction cache, wherein each of the address and instruction handlers are aligned with one of the cache lines according to the present invention;

FIG. 10 is a flowchart depicting the modified binary search routine employed by the present invention;

DETAILED DESCRIPTION OF PREFERRED EMBODIMENT

Figure 1:
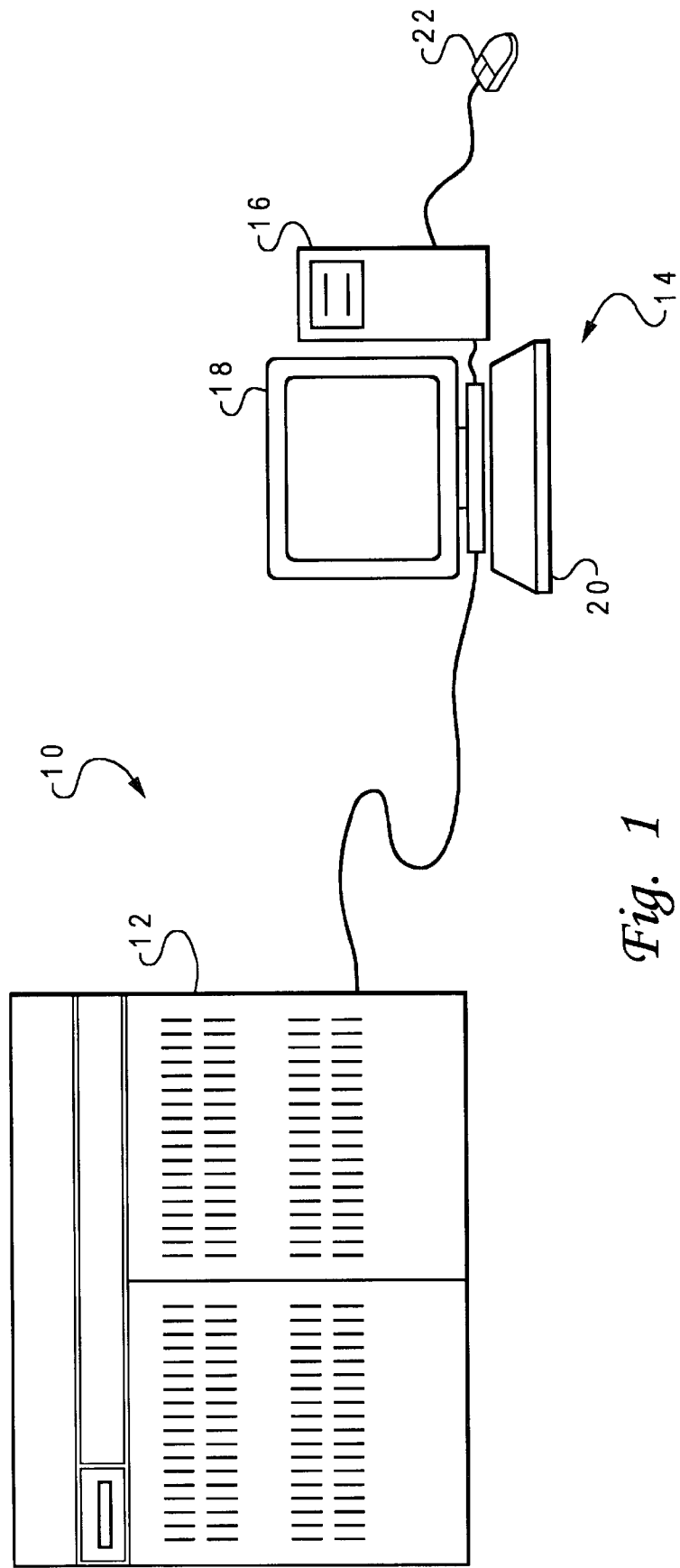
FIG. 1 illustrates a preferred embodiment of a data processing system within which the present invention may be advantageously employed.

With reference now to the figures and in particular with reference to FIG. 1, there is illustrated a pictorial representation of a data processing system 10 which may be utilized to implement the method of the present invention. In the depicted embodiment, data processing system 10 includes server 12 and one or more clients 14. Each client 14 comprises a personal computer 16, display device 18, keyboard 20, and mouse 22. As is well-known to those skilled in the art, a user can input data to personal computer 16 utilizing keyboard 20, mouse 22, or other suitable input device. The user may then process data locally utilizing personal computer 16, or transmit the data from personal computer 16 to server 12 for processing. It is advantageous for a user to send tasks to server 12 for execution since server 12 can perform tasks in a relatively short period of time compared with clients 14.

Figure 2:
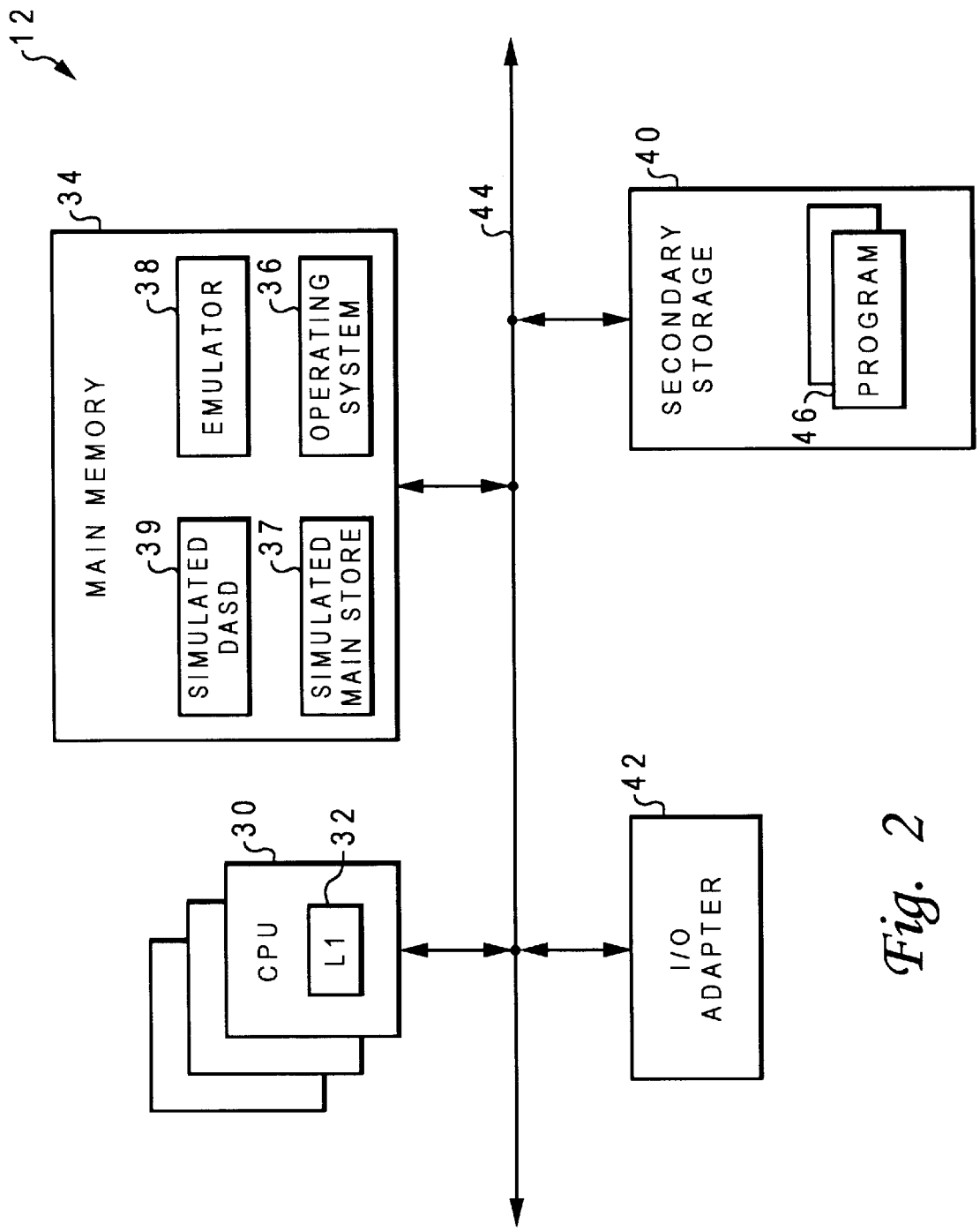
FIG. 2 depicts a block diagram of the system unit of the data processing system illustrated in FIG. 1.

Referring now to FIG. 2, there is depicted a block diagram of server 12, which in a preferred embodiment of the present invention comprises a computer such as the IBM AS/400. Server 12 includes one or more CPUs 30, main memory 34, secondary storage 40, and I/O adapter 42, which are all coupled by system bus 44. As will be appreciated by those skilled in the art, system unit 12 includes additional devices which are not necessary for an understanding of the present invention and are accordingly omitted from FIG. 2 for the sake of simplicity. CPUs 30 preferably comprise one of the PowerPC™ line of microprocessors available from IBM Microelectronics. As depicted, each of CPUs 30 has an on-board level one (L1) cache 32, which comprises a relatively small, fast portion of memory that stores frequently accessed data and instructions. As is typical of cache memories, L1 cache 32 is divided into a number of cache lines to which multiple memory addresses within main memory 34 are mapped.

Each CPU 30 runs under operating system 36, which in a preferred embodiment of the present invention comprises AS/400 Licensed Internal Code (LIC). In this preferred embodiment, operating system 36 includes a storage management facility which manages the virtual memory space of CPU 30 as a series of 16 MB "segments," where a segment is a portion of the virtual memory space that is treated as a unit for various purposes, including protection, assignment to a task or process, etc. Segments associated with an active task or process are accessed utilizing 32 8-byte general purpose registers within CPU 30. According to this addressing scheme, the first 5 bytes within a 64-bit address specify a particular segment while the remaining 3 bytes specify a displacement within the segment. Each of the 16 MB segments is itself comprised of 4,096 4 KB virtual memory pages, which are paged between secondary storage 40 and main memory 34 as data and instructions are required by LIC, emulator 38, or other software executed by CPUs 30. As will be understood by those skilled in the art, secondary storage 40 may include one or more hard disks, optical disks, floppy disk drives, or other mass storage devices.

According to the present invention, in addition to operating system 36, main memory 34 stores emulator 38. As will be understood by those skilled in the art, emulator 38 is a software interface between operating system 36 and programs written to execute under an incompatible operating system. Emulator 38 includes a number of instruction handlers, each comprising one or more instructions, which are utilized to emulate program instructions, such as those within program 46, that are incompatible with operating system 36. Furthermore, emulator 38 maps registers and other resources referenced by program 46 to hardware registers within CPU 30 or emulated data areas (e.g., simulated main store 37 and simulated DASD 39) within L1 cache 32 or main memory 34. As described in greater detail below, according to an important aspect of the present invention, when program 46 is emulated, emulator 38 accesses instructions within program 46 directly out of simulated DASD 39 and does not page the program instructions into simulated main store 37.

System unit 12 further includes I/O adapter 42, which provides means for outputting data to a user, for example, by transmitting data to an attached printer or similar output device. I/O adapter 42 also contains facilities which support communication between server 12 and remote nodes within a local area network (LAN) or other communications network. The communications facilities provided by I/O adapter 42 may be advantageously utilized in environments in which programs to be emulated by emulator 38 are stored within a remote library.

As will become apparent from the following description, the present invention may be applied to the emulation of a variety of different operating system environments. However, the remainder of the description of the present invention describes an exemplary emulation of the IBM System/36, a well-known mainframe business computer, within the data processing system illustrated in FIG. 2.

Figure 3:
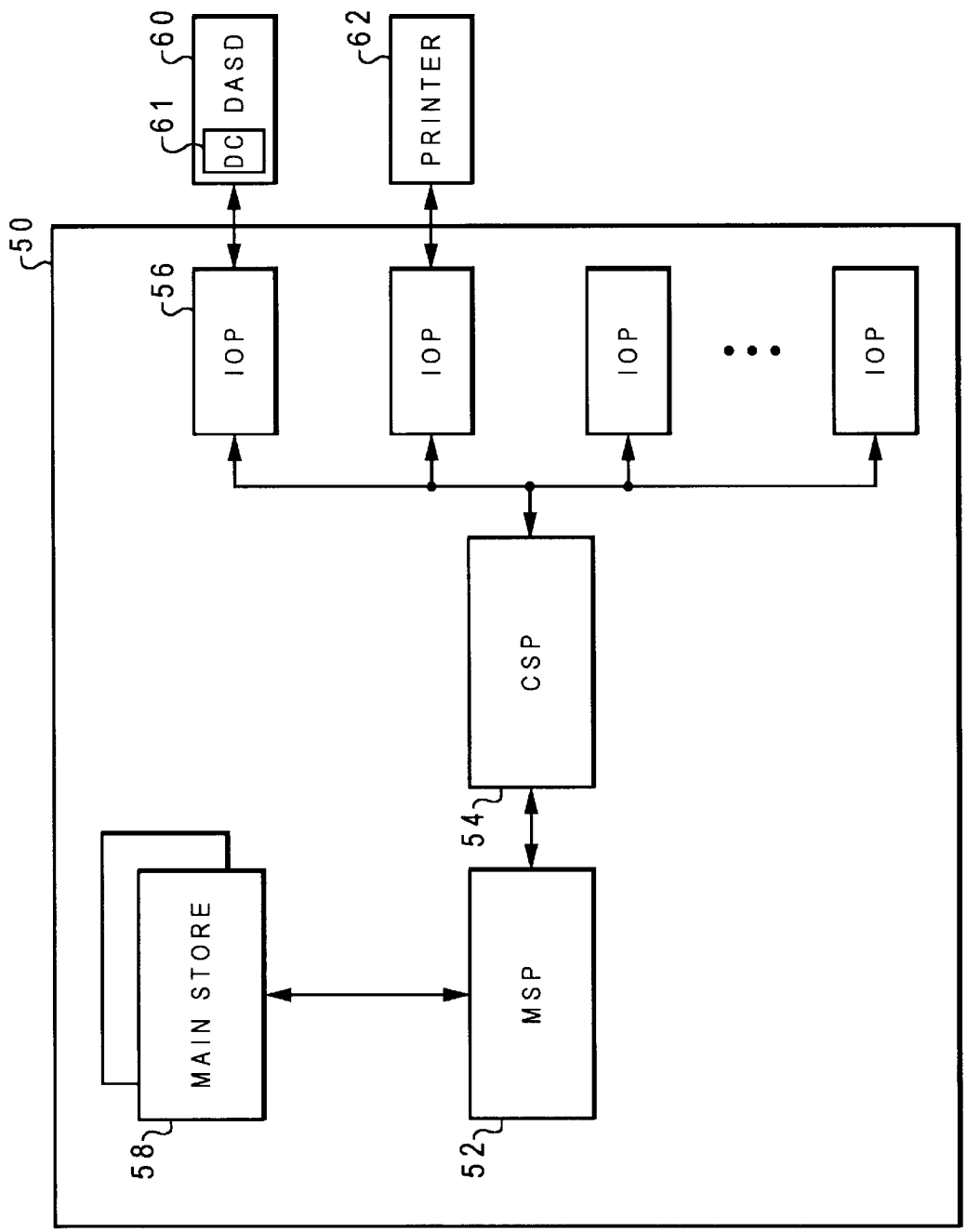
FIG. 3 illustrates a block diagram of the processor complex of an exemplary data processing system emulated by the present invention.

With reference now to FIG. 3, there is illustrated a block diagram of the processor complex 50 of an IBM System/36

(S/36) computer. Processor complex 50 comprises main store processor (MSP) 52, control store processor (CSP) 54, multiple I/O processors (IOPs) 56, and main store 58. MSP 52, the 16-bit processor emulated by the present invention, executes user application programs out of main store 58 under an operating system. MSP 52 utilizes an instruction set consisting of 138 opcodes, including 30 unique instruction types. To access hardware such as DASD 60 and printer 62, MSP 52 issues a service call (SVC) to CSP 54, which runs the kernel of the operating system and interfaces between MSP 52 and the IOPs 56 that control the desired peripheral devices.

The S/36 supports both 24-bit real and translated addressing modes. In real addressing mode, as indicated by bit 0 of an address being set to 0, the following 23 bits of the address specify a physical address. Thus, in real addressing mode, a maximum of 8 MB of data can be addressed. Alternatively, when bit 0 of an address is set to 1, the remaining 23 bits are translated utilizing an address translation table to locate the associated physical address. The operating system running on MSP 52 manages memory by allocating 2 KB virtual memory pages to various storage objects (e.g., programs or data spaces). As is typical of paging architectures, the pages are swapped between main store 58 and DASD 60 as needed. When storage objects are placed within main store 58, entries are made within the address translation table that indicate the page numbers and associated physical addresses of each storage object. Thus, when utilizing the translated addressing mode, MSP 52 utilizes bits 8–12, the page selector bits, to index an entry in the address translation table. The address translation table associates the page selector bits with a 16-bit page number, which is concatenated to the page offset (bits 13–23 of the address) to access the appropriate physical memory location. By referencing storage objects through the address translation table, the memory pages associated with a storage object can be scattered in discontiguous physical locations within main store 58 while appearing to be contiguous to application programs. It is important to note that address translation is performed during each memory access which utilizes translated addressing mode. Thus, when executing a "move" instruction, which stores up to 256 bytes, up to 260 address translations can be required (128 fetch addresses+128 store addresses+4 additional translations if both the fetch and store addresses are unaligned with a 2-byte boundary).

To minimize both address translation and paging overhead during emulation, main store 58 and DASD 60 are each simulated as segments within the address space of system unit 12. As such, simulated main store 37 and simulated DASD 39 can both be accessed identically, thus enabling emulator 38 to avoid paging portions of program 46 between simulated DASD 39 and simulated main store 37 when fetching emulated instructions. More importantly, since all program objects are stored contiguously within a single segment (i.e., the segment allocated to simulated DASD 39), address translation overhead is eliminated when fetching emulated instructions within program 46. In addition, address translations occasioned by data accesses are limited to one per operand by not allocating data objects across a segment boundary of simulated DASD 39. For example, when emulating the 256-byte move instruction described above, only the starting addresses of the fetch and store operands are translated, limiting the maximum number of translations required for an instruction to 2.

Figure 4:
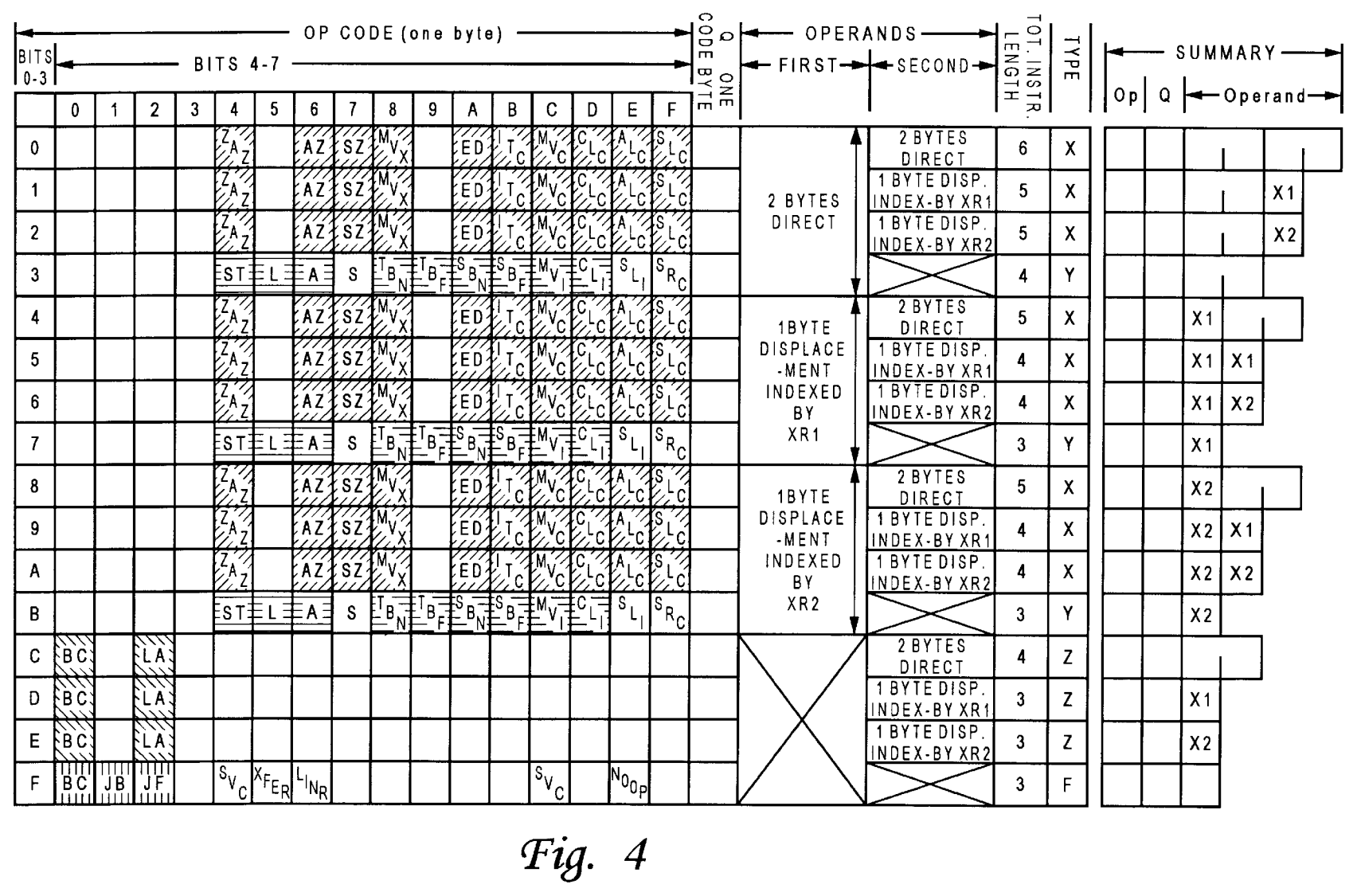

Referring now to FIG. 4, there is depicted a chart of the 138 opcodes within the instruction set of MSP 52. As illustrated, each instruction within the instruction set includes a 1-byte opcode, a Q byte, which specifies additional information about the instruction, and up to 2 operands specified by 0–4 bytes. The duplication of instruction mnemonics (e.g., MVX, SLC, SZ, etc.) within the chart is due to the fact that a variety of methods of operand addressing are available for many instructions. Thus, the illustrated instruction set supports 9 ways of 2 operand addressing, 6 ways of 1 operand addressing, and 1 way of utilizing no operands. These 16 methods of addressing are emulated by address handler routines O-F, which are illustrated within the first 16 cache lines of the instruction portion of L1 cache 32 in FIG. 5.

With reference now to FIG. 5, there is illustrated a pictorial representation of a preferred embodiment of the instruction portion of L1 cache 32. In the depicted embodiment, L1 cache 32 is a 8 KB bifurcated cache, having 4 KB of data storage and 4 KB of instruction storage. As illustrated, the instruction portion of L1 cache 32 comprises 64 64-byte cache lines. In addition to address handlers O-F, L1 cache 32 stores a number of instruction handlers, which are each utilized to emulate one of the 30 unique instructions within the instruction set depicted in FIG. 4. Thus, the present invention emulates a S/36 instruction by executing one of the 16 instruction handlers in combination with one or more of the instruction handlers.

According to an important aspect of the present invention, each of the address and instruction handlers is stored within main memory 34 such that when the address and instruction handlers are mapped into L1 cache 32, each of the address and instruction handlers is aligned on a 64-byte cache line boundary. The instructions handlers are preferably arranged such that instruction handlers which are mapped to the same cache line, for example, instruction handlers ZO and XO, are not both utilized to emulate high-use instructions. Instruction handlers associated with invalid opcodes, which are indicated by asterisks in FIG. 5 and appear as blanks in the chart illustrated in FIG. 4, contain one instruction to branch to an error routine as well as the continuation of one or more instruction handlers which do not fit within a single 64-byte cache line (i.e., the instruction handler is longer than 16 instructions). The alignment of address and instruction handlers along cache line boundaries minimizes instruction cache misses, thereby decreasing the emulation instruction latency and the CPI (cycle per instruction) ratio. This performance enhancement is particularly significant in embodiments of the present invention having only a bilevel memory hierarchy (i.e., L1 cache and memory) and therefore a higher instruction latency when an instruction cache miss occurs.

Figure 6:
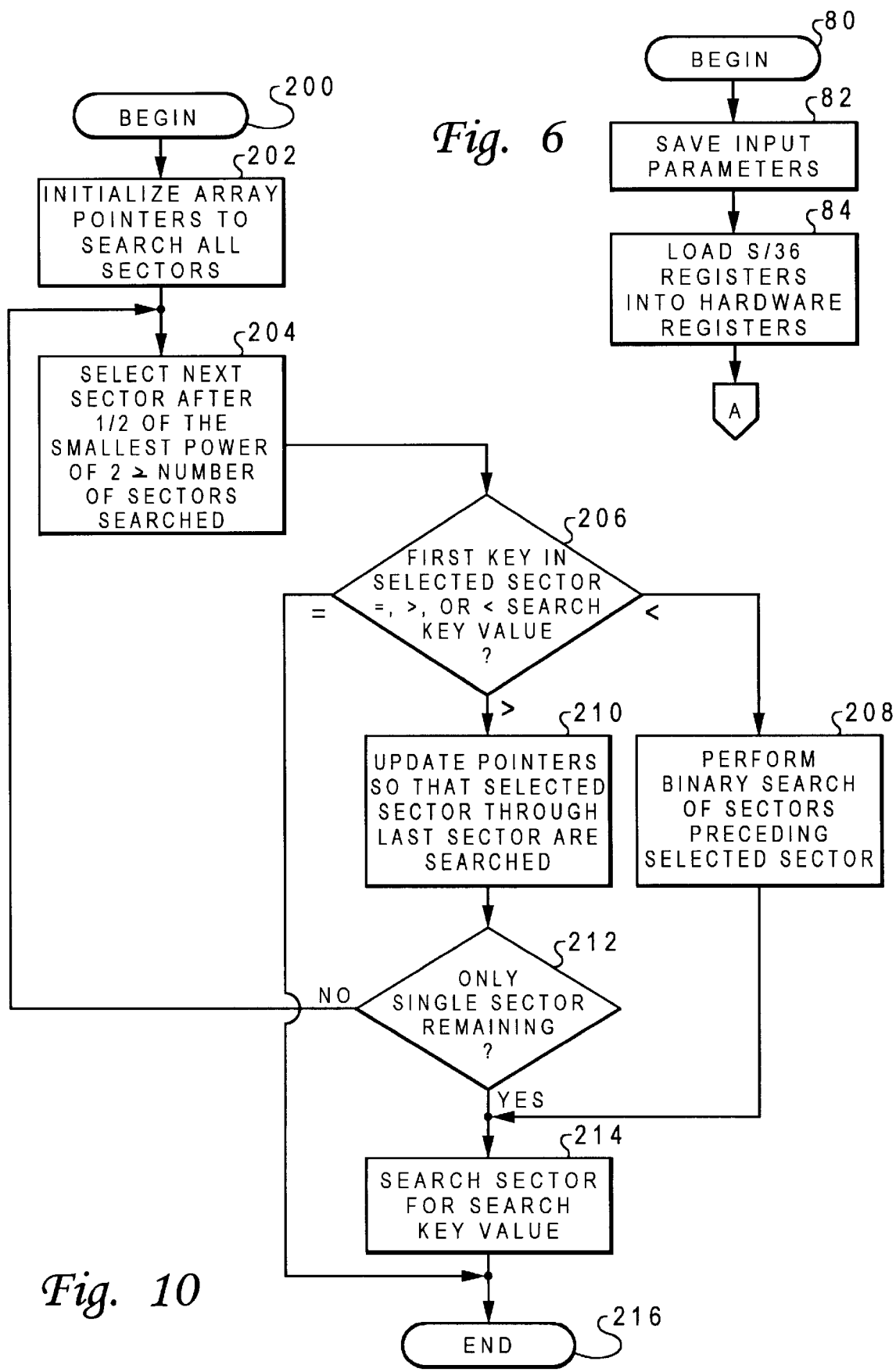
FIG. 6 depicts a flowchart of the initialization portion of a preferred embodiment of the emulator of the present invention.
Figure 12:
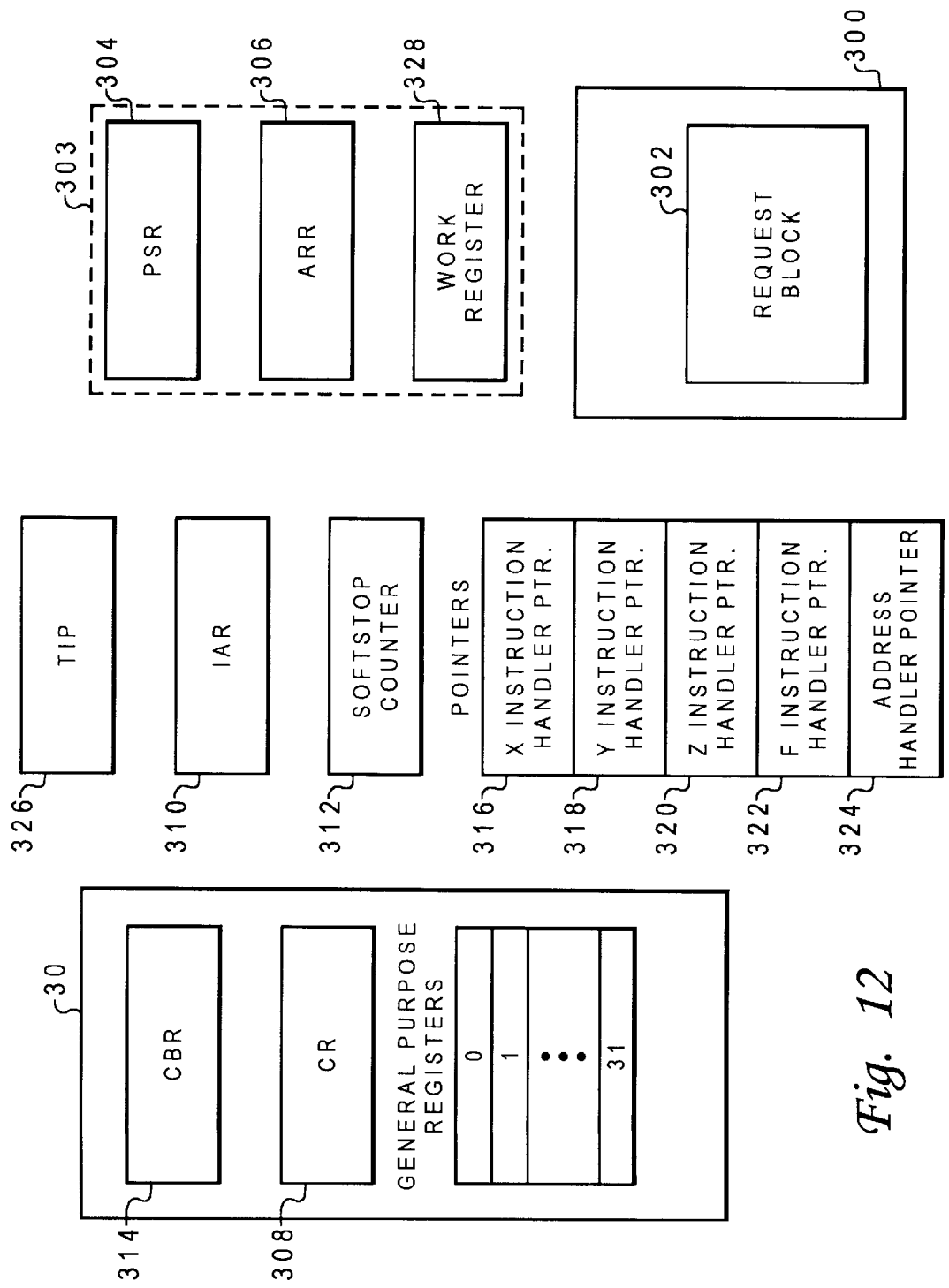
FIG. 12 depicts a graphical representation of the emulation registers and processor hardware registers utilized during emulation of a program according to a preferred embodiment of the present invention.

Referring now to FIG. 6, there is depicted a flowchart of the initialization portion of emulator 38 illustrated in FIG. 1. The process begins at block 80 when a user initiates execution of program 46 stored within secondary storage 40. In response to the initiation of program 46, operating system 36 allocates data area 300 illustrated in FIG. 12 to emulator 38. Operating system 36 then locates (or builds) a request block 302 associated with program 46 and stores the starting address of program 46 within request block 302. The process proceeds from block 80 to block 82, which illustrates emulator 38 storing input parameters such as the address of simulated main store 37 and request block 302 within request block 302. Next, as depicted at block 84 of FIG. 6 and within FIG. 12, emulator 38 loads emulated S/36 registers 303, including program state register (PSR) 304 and address recall register (ARR) 306, into hardware registers within CPU 30.

Figure 8:
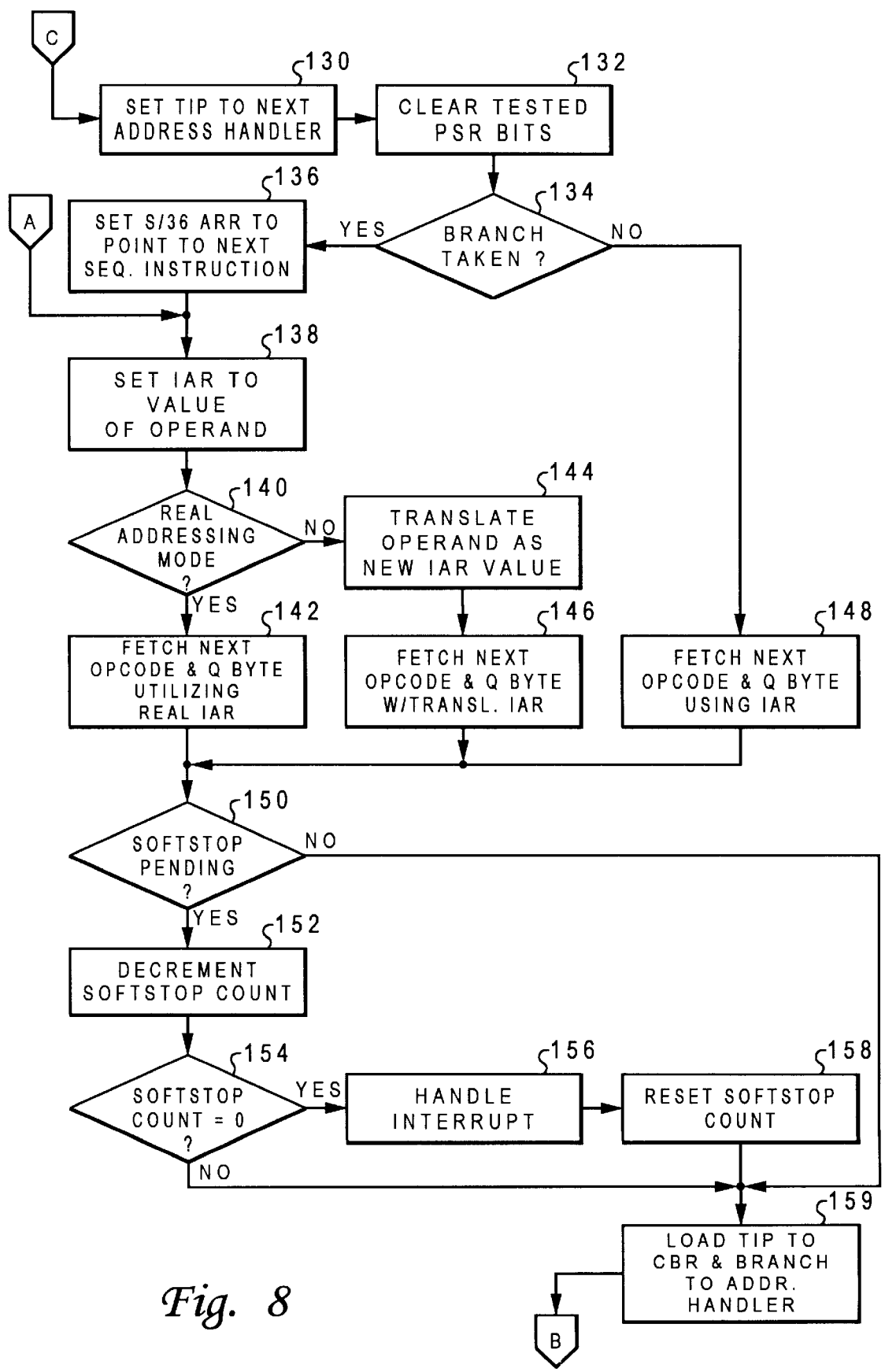
FIG. 8 is a flowchart depicting an instruction handler for a branch on condition instruction.

Thereafter, the process proceeds to block 138 of FIG. 8, which illustrates setting instruction address register (IAR)

310, which indicates the address of the next instruction to be emulated within program 46, to the value of an operand. During normal execution of emulator 38, the operand is loaded together with the opcode of the branch instruction depicted in FIG. 8. However, when emulator 38 is performing block 138 during initialization, the operand is loaded from request block 302. The process then proceeds to block 140, which depicts determining whether the value within IAR 310 specifies a real or logical address. The determination illustrated a block 140 is preferably made by extracting bit 0 of IAR 310 and testing bit 0 within hardware condition register 308 of CPU 30. If a determination is made that the value within IAR 310 specifies a real address, the process proceeds to block 142, which illustrates fetching the opcode and Q byte of the next instruction to be emulated utilizing the value of IAR 310 as a real address. However, if a determination is made at block 140 that IAR 310 specifies a logical address, the process proceeds to block 144, which depicts translating the value of IAR 310 to determine a translated address of the opcode and Q byte of the next instruction to be executed. Next, the process proceeds to block 146, which illustrates fetching the opcode and Q byte indicated by the translated IAR.

The address of the instruction handler corresponding to the fetched opcode is then loaded into target instruction pointer (TIP) 326, which is utilized to point to the address of the next address or instruction handler to be executed. The process proceeds from either block 142 or block 146 to block 150, which depicts determining whether a softstop, a type of S/36 interrupt described below, is pending. If no softstop is pending, the process proceeds to block 159, which illustrates loading TIP 326 into CBR 314, a hardware branch register within CPU 30, and branching to the address specified by CBR 314. Since an address handler is specified, the process passes through off-page connector B of FIG. 8 to on-page connector B of FIG. 7.

Figure 7:
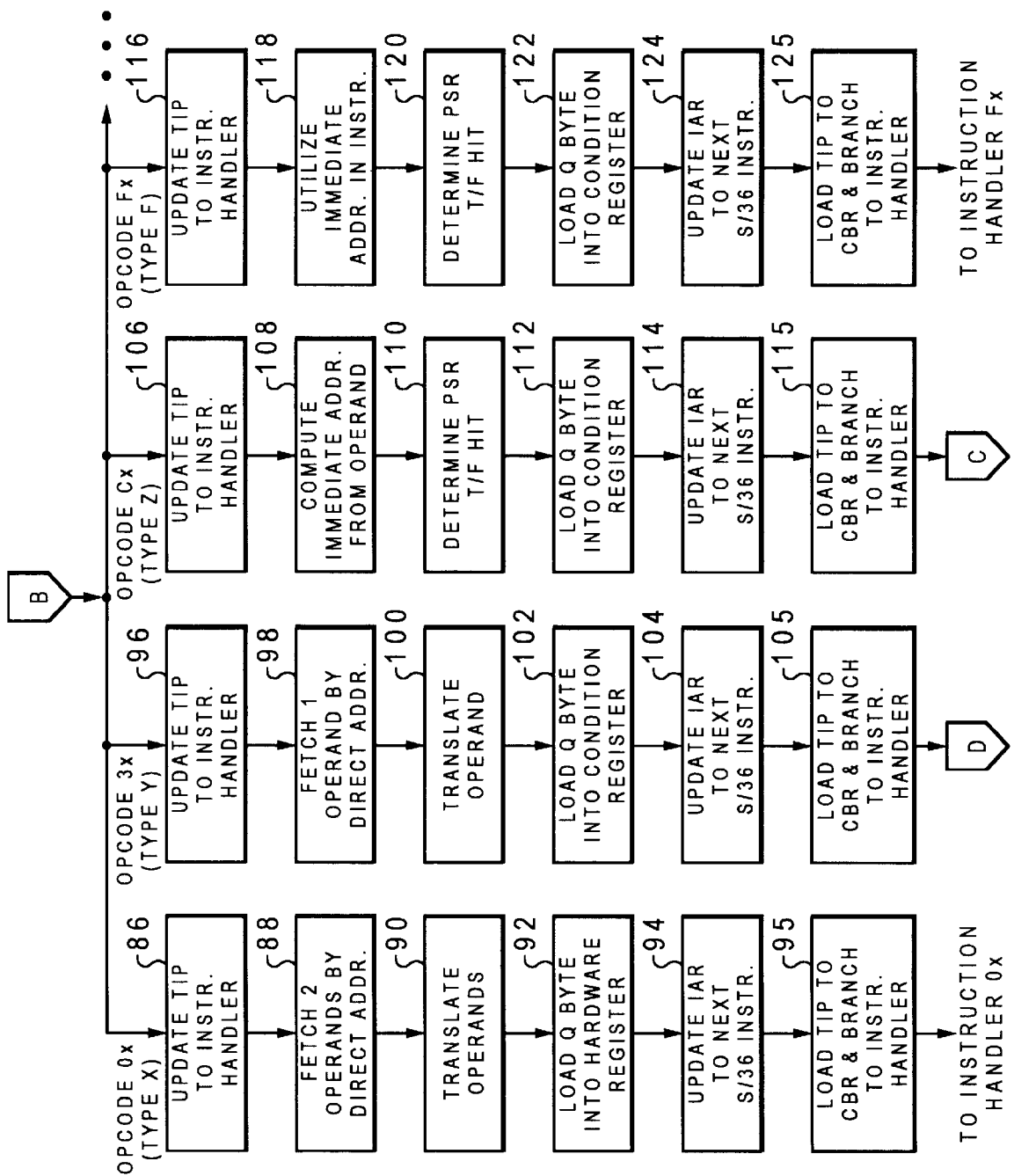
FIG. 7 is a flowchart illustrating four of the sixteen address handlers utilized by a preferred embodiment of the emulator of the present invention.

With reference now to FIG. 7, there is illustrated a flowchart of four of the sixteen instruction handlers utilized by emulator 38. As indicated, FIG. 7 illustrates one instruction handler corresponding to each of instruction types X (blocks 86–95), Y (blocks 96–105), Z (blocks 106–115), and F (blocks 116–125). Because of similarities between the address handlers, only the Z and Y types of address handlers will be described in detail.

Referring first to block 106–114, there is depicted a flowchart of the Z address handler corresponding to opcodes Cx shown in FIG. 4. The address handler begins at block 106, which illustrates updating TIP 326 to point to the Z instruction handler indicated by the opcode of the emulated instruction. For example, if the opcode of the instruction is C0, TIP 326 specifies the address of instruction handler Z0. As illustrated within FIG. 12, in a preferred embodiment of the present invention, emulator 38 also maintains instruction handler pointers 316–322, which each point to the next instruction handler of the corresponding instruction type to be executed by CPU 30. In addition, emulator 38 maintains address handler pointer 324, which points to the address of the next instruction handler to be executed by CPU 30.

Returning to FIG. 7, the process proceeds to block 108, which depicts emulator 38 computing the immediate address of the instruction from the operand. As depicted within FIG. 4, the operand of an instruction having a Cx opcode is specified by a two-byte direct address. The process proceeds from block 108 to block 110, which illustrates determining whether the condition upon which the emulated instruction depends is true or false. The determination depicted at block 110 entails testing selected bits within S/36 emulated program status register (PSR) 304. Thereafter, the process proceeds to block 112, which depicts loading the Q byte of the emulated instruction into hardware condition register 308 within CPU 30. As indicated above, the Q byte of an emulated instruction contains additional information utilized during execution of the emulated instruction. Thereafter, the process proceeds to block 114, which illustrates updating IAR 310 to specify the address of the next instruction within program 46 to be emulated. The process then proceeds to block 115, which depicts loading TIP 326 into CBR 314 and branching to the instruction handler specified by CBR 314. The process then passes through off-page connector C to the type Z instruction handler specified by CBR 314, an example of which is illustrated in FIG. 8.

Referring now to FIG. 8, there is depicted a flowchart of a branch conditional instruction handler utilized by a preferred embodiment of the present invention to emulate opcodes CO, DO, and EO. The instruction handler begins at block 130, which illustrates setting TIP 326 to the address of the address handler corresponding to the next sequential instruction within program 46 to be emulated. The process proceeds from block 130 to block 132, which depicts clearing the bits within PSR 304 which were tested previously, for example, at block 110 of FIG. 7. Clearing the tested bits at block 132 prevents a single occurrence of a particular state from generating multiple true conditions during emulation of branch instructions. Next, the process proceeds to block 134, which illustrates determining whether the branch should be taken. If the condition upon which the branch depends is determined to be false, the process proceeds from block 134 to block 148, which illustrates fetching the next (sequential) opcode and Q byte utilizing IAR 310. Thereafter, the process proceeds to block 150.

However, if the condition upon which the branch depends is true, the process proceeds from block 134 to block 136, which illustrates setting the emulated S/36 address recall register (ARR) to point to the sequential instruction following the target emulated instruction. Thus, as will be understood by those skilled in the art, ARR 306 stores a return address utilized in a call and return (i.e., modular) programming methodology. The process then proceeds from block 136 to blocks 138–146, which have been described above.

The process then proceeds from either of blocks 142, 146, and 148 to block 150, which illustrates determining if a softstop interrupt is pending. MSP 52 has three mechanisms for interrupting execution of a program: (1) invalid instructions, (2) hardstops, and (3) softstops. The first mechanism for halting execution of a program invokes an interrupt handler routine upon detection of an invalid opcode or invalid address. For example, the SVC instruction (opcode F4) utilized by MSP 52 to invoke services within CSP 54 is interpreted as an invalid opcode by MSP 52. The second mechanism, a hardstop, is utilized to halt MSP 52 between instructions to enable instruction stepping, for example, during debugging. The third mechanism, a softstop, is utilized by the operating system's task dispatcher to control multitasking and preemptive dispatching. MSP 52 honors softstop requests only after executing branch, jump, and other similar instructions which do not modify instructions or data in order to support reentrant programming and modification of data areas without implementing locks.

To emulate the handling of softstop requests, emulator 38 also handles softstop requests when executing nonmodifying branch-type instructions, such as the branch conditional instruction depicted in FIG. 8. However, in order to avoid the overhead associated with storing and recovering the emulation context (i.e., the values of registers 304–326), emulator 38 grants softstop requests only upon the occurrence of a userselected number of SVC or other nonmodifying branch-type instructions. Thus, if a determination is made at block 150 that a softstop is pending, the process proceeds to block 152, which illustrates decrementing softstop counter 312, which counts down from the user-selected value to zero. The process then proceeds to block 154, which depicts determining whether the softstop count within softstop counter 312 is equal to zero. If the softstop count is equal to zero, the process proceeds to blocks 156 and 158, which depict handling the softstop request and resetting the softstop counter 312 to the user-selected value. Thereafter, the process proceeds to block 159, which illustrates branching to the instruction handler corresponding to the opcode fetched at one of blocks 142, 146, and 148 by loading CBR 314 with the address of the appropriate instruction handler and executing a branch to the address within CBR 314. As illustrated, the process alternatively passes to block 159 from either block 150 or block 154 if a softstop is not pending or if the softstop count is not equal to zero. The process then returns through off-page connector B to FIG. 7.

Referring again to FIG. 7, an address handler for a type Y instruction is now described. The process begins at block 96, which illustrates updating TIP 86 to point to the instruction handler associated with the opcode of the current instruction. The process then proceeds to block 98, which depicts fetching the operand of the current instruction utilizing the two-byte direct address of the operand. Next, the process proceeds to block 100, which illustrates translating the operand, which is an address, from a S/36 address to an address utilized by CPU 30. The process then proceeds to block 102, which depicts loading the Q byte into hardware condition register 308 of CPU 30. Next, at block 104, emulator 38 updates IAR 310 to specify the subsequent S/36 instruction to be emulated. Thereafter, TIP 326 is loaded into CBR 314 and CPU 30 branches to a Y instruction handler. Accordingly, the process passes through off-page connector D to on-page connector D of FIG. 9.

Figure 9:
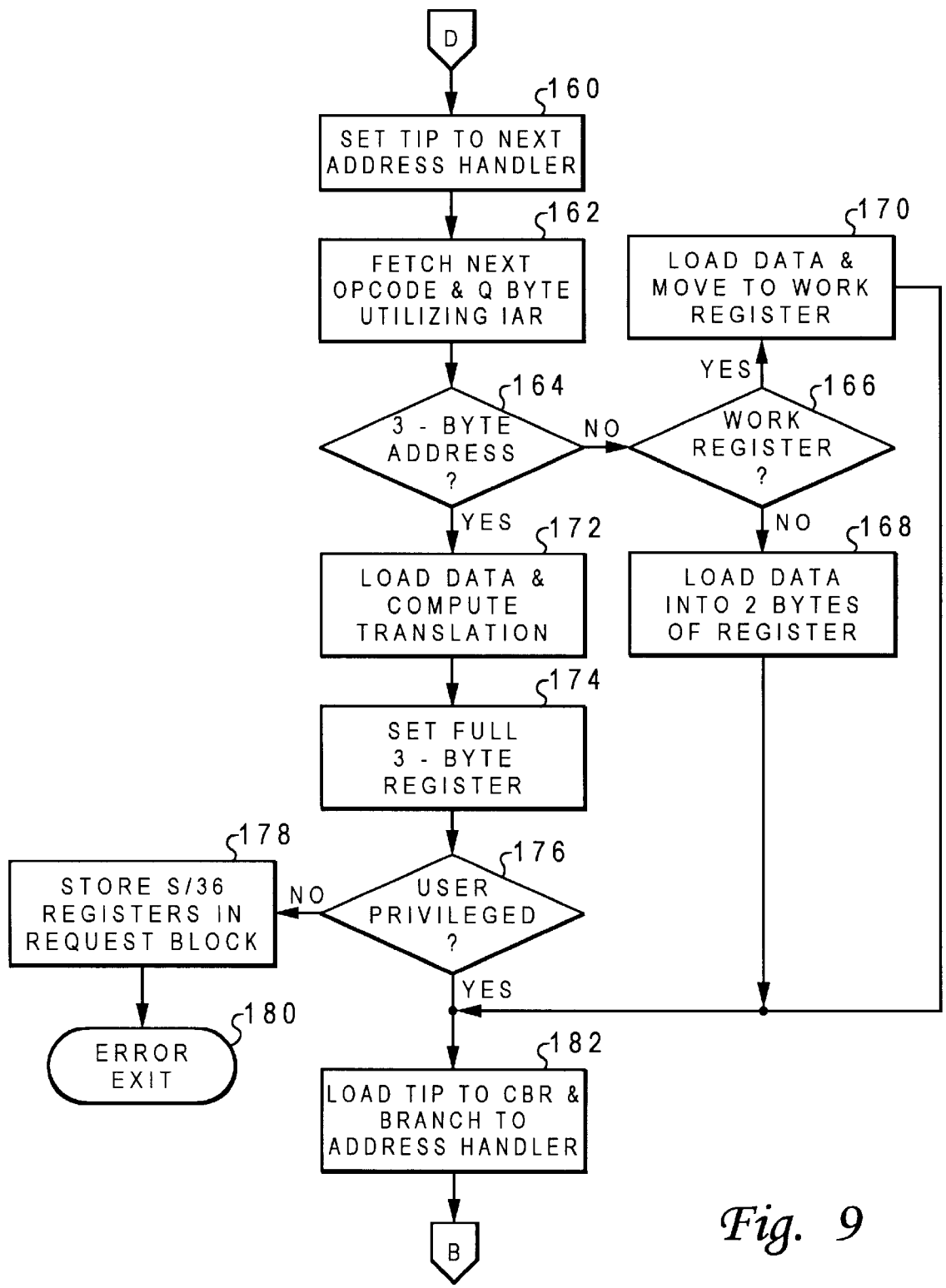
FIG. 9 is a flowchart illustrating the instruction handler for a load register instruction.

With reference now to FIG. 9, there is illustrated a flowchart of the instruction handler for a load register instruction. Following on-page connector D, the process passes to block 160, which illustrates setting TIP 326 to the address of the address handler corresponding to the next instruction to be emulated. The process then proceeds to block 162, which illustrates fetching the opcode and Q byte of the next program instruction to be emulated utilizing IAR 310. Block 162 illustrates an important aspect of the present invention, namely, that when executing certain instructions which cannot modify subsequent instructions, for example, load instructions, emulator 38 fetches the next program instruction to be emulated, thereby simulating the pipelined architecture of CPU 30. This software pipelining enhances the execution efficiency of CPU 30 by reducing the number of cycles that the execution units within CPU 30 are idle. The prefetch instruction depicted at block 162 is preferably inserted within instruction handlers at points of latency in order to further enhance emulation performance.

The process proceeds from block 162 to block 164, which depicts determining whether the value to be loaded is specified by a three-byte address. Although MSP 52 has a sixteen-bit architecture, architectural extensions enable a third address byte to be utilized if so indicated by the Q byte. If a determination is made at block 164 that a three-byte address is not utilized, the process proceeds to block 166, which depicts determining whether the value is to be loaded into emulated MSP work register 328 illustrated in FIG. 12. If not, the process proceeds to block 168, which illustrates loading the data specified by the two-byte direct operand address and storing the data into the register specified by the instruction opcode. However, if the data is to be loaded into work register 328, the process proceeds from block 166 to block 170, which illustrates loading the data from the specified address into work register 328. The process passes from either block 166 or block 170 to block 182.

Returning to block 164, if a three-byte address is utilized to specify the location of the requested data, the process proceeds from block 164 to block 172, which depicts loading the operand and computing the address translation. The process then proceeds to block 174, which illustrates concatenating the third address byte with the two-byte translated address to form a three-byte address and loading the data from the specified address. Next, the process proceeds to block 176, which depicts determining whether the user (i.e., application or operating system) is privileged to alter the address mode. If a determination is made at block 176 that the user is not privileged to alter the address mode, the process proceeds to block 178, which illustrates storing the S/36 registers within request block 302. Thereafter, emulator 38 terminates at block 180 with an error. However, if the user is privileged to alter the address mode, the process proceeds to block 182, which depicts returning to FIG. 7 by loading TIP 326 into CBR 314 and branching on CBR 314.

Referring now to FIG. 10, there is depicted a flowchart of the process utilized by the present invention to emulate scanning a multilevel disk directory for a key value. As illustrated in FIG. 3, the S/36 includes a disk controller (DC) 61, which controls operations of DASD 60. DC 61 maintains a bilevel disk directory which, for each disk sector, associates keys of indexed files with the location of the files on the disk. Thus, the first level of the disk directory is sequentially ordered by sector number, while the second level of the disk directory is sequentially ordered by key number. DC 61 includes facilities to sequentially search the disk directory to locate a particular key value. In order to support this hardware-managed key search feature, emulator 38 includes the modified binary search routine depicted in FIG. 10.

Figure 11:
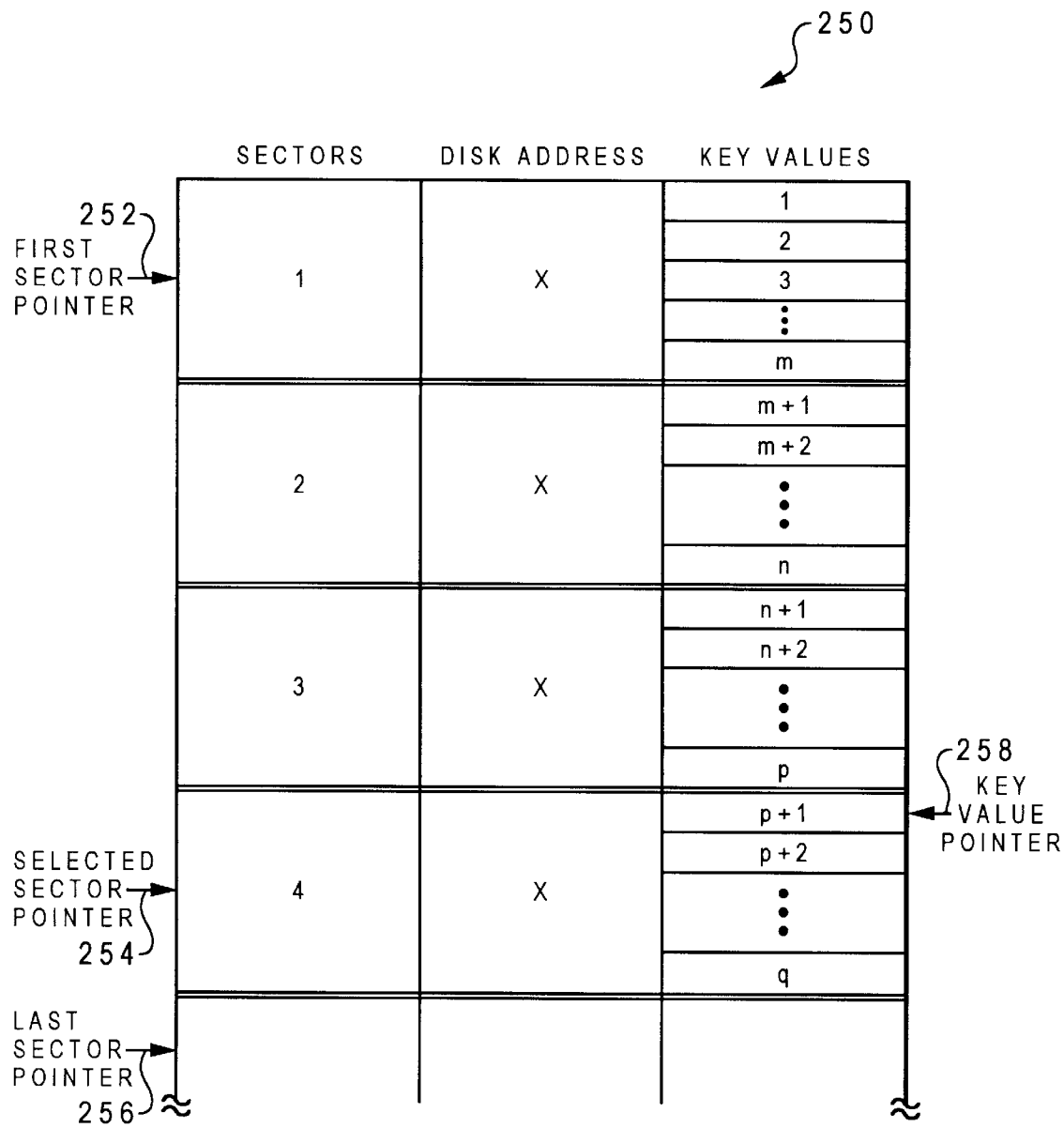
FIG. 11 is a pictorial representation of a bilevel indexed disk directory which can be searched utilizing the modified binary search routine of the present invention.

As illustrated, the process begins at block 200 when emulator 38 receives a request to search the disk directory of simulated DASD. The process then proceeds to block 202, which depicts emulator 38 initializing selected sector pointer 254 and a key value pointer 258. Referring now to FIG. 11, there is illustrated a pictorial representation of disk directory 250 maintained by emulator 38 within the simulated DASD 39. Disk directory 250 has a first sector pointer 252, which points to the first sector to be searched, a last sector pointer 256, which indicates the last sector to be searched, and a selected sector pointer 254, which indicates the current sector being searched. In addition, key value pointer 258 specifies the key value to be compared to the searched key value. Returning to FIG. 10, the process proceeds from block 200 to block 202, which illustrates initializing first sector pointer 252 to point to the first sector within disk directory 250 and initializing last sector pointer 256 to point to the last sector within disk directory 250. The process then proceeds to block 204, which depicts dividing the sectors into two sets. The first set includes sectors up to and including the sector number equal to half of the smallest power of two greater than or equal to the number of sectors being searched. The second set includes the remaining sectors. Selected sector pointer 254 is then pointed to the first sector within the second set. For example, if disk directory 250 includes 14 sectors, selected sector pointer 254 is pointed to the ninth sector at block 204 since 16 is the smallest power of 2 greater or equal to 14.

Next, the process proceeds to block 206, which illustrates determining whether the value of the first key within the selected sector is equal to, greater than, or less than the search key value. In response to a determination that the first key value within the selected sector is equal to the search key value, the process terminates at block 216 by returning the selected sector number and key value. However, if a determination is made that the first key within the selected sector has a value less than the search key value, the process proceeds to block 208, which depicts performing a conventional binary search of sectors within the first set in order to locate the search key value. The process then proceeds from block 208 to block 214.

Returning to block 206, if a determination is made that the first key within the selected sector is greater than the search key value, the process proceeds from block 206 to block 210, which depicts updating first sector pointer 252 and last sector pointer 256 such that only sectors within the second set are searched. For example, if selected sector pointer 254 was pointed to the 9th sector of 14 total sectors, first sector pointer 252 is updated to point to the 9th sector, while last sector pointer 256 remains pointed to the last sector within disk directory 250. The process proceeds from block 210 to block 212, which illustrates determining whether only a single sector remains to be searched, that is, whether first sector pointer 252 and last sector pointer 256 are pointed to the same sector. If more than one sector remains to be searched, the process returns from block 212 to block 204. At block 204 selected sector pointer 254 is updated to point to the first sector within a new second set. If disk directory 250 includes 14 total sectors and a determination is made that the search key value is not within the first 8 sectors, selected sector pointer 254 is updated to point to the 4th sector among the 6 sectors remaining to be searched (i.e., sector 12). The search continues in this fashion until the sector containing the search key value is located.

Thereafter, the process proceeds from either block 212 or block 208 to block 214, which illustrates searching the sector containing the search key value to locate the search key value. Depending upon the number of key values within the sector, the search illustrated at block 214 may be accomplished utilizing a variety of search techniques. For example, if only a few key values are within the sector, a simple sequential search may be performed. However, if a multiplicity of key values are within the sector, the modified binary search illustrated in FIG. 10 may be employed to search the key values for the search key value. The process then terminates at block 216.

Although the process illustrated in FIG. 10 has been described with reference to a disk directory, those skilled in the art will appreciate that the modified binary search technique depicted herein may advantageously be applied to search the contents of any multilevel data structure in which the entries are sequentially ordered.

As has been described, the present invention provides an improved data processing system and method for emulating a program written to execute under an operating system that is incompatible with the operating system utilized by the data processing system. In a first aspect of the present invention, instruction handlers utilized to emulate instructions recognized by the second operating system are aligned with cache line boundaries of the instruction cache in order to minimize instruction cache misses. According to a second aspect of the present invention, the data processing of the present invention emulates instructions directly out of a simulated DASD backing store in order to minimize emulation overhead. Furthermore, in a third aspect of the present invention, opcodes of emulated instructions are prefetched in order to maximize utilization of the execution pipeline of the processor. The present invention also delays handling interrupts until a user-selected number of branch or other non-reentrant instructions are executed in order to minimize emulation overhead. Finally, according to a fifth aspect of the present invention, the emulator of the present invention implements a modified binary search algorithm in order to efficiently search a multilevel disk directory.

As indicated by the flowcharts described heretofore, aspects of this invention pertain to specific "method functions" implementable on computer systems. Those skilled in the art should readily appreciate that programs defining these functions can be delivered to a computer in many forms, including, but not limited to: (a) information permanently stored on non-writable storage media (e.g., read only memory devices within a computer of CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. In a data processing system having at least one processor and data storage, a method for efficiently searching an array for a search value, said method comprising:
   (a) storing in the data storage of the data processing system an array including N records, wherein each of said N records includes at least a first entry, wherein entries within all of said N records are ordered according to a value of said entries;
   (b) utilizing said at least one processor, setting W, a number of said N records within said array to be searched, equal to N;
   (c) utilizing said at least one processor, assigning each of said W records to either a first set or a second set, wherein records within each of said first set and said second set are sequentially ordered, said first set including X/2 of said W records, where X is a smallest power of 2 equal to or greater than W;
   (d) utilizing said at least one processor, determining whether said search value precedes, matches, or follows a first entry within a first record within said second set;
   (e) in response to a determination that said search value precedes said first entry of said first record within said second set, utilizing said at least one processor to perform a binary search of records within said first set of records to identify a record including an entry having a value equal to said search value;
   (f) in response to a determination that said value of said first entry within said first record within said second set is equal to said search value, identifying said first record within said second set as containing an entry matching said search value;
   (g) in response to a determination that said search value follows said first entry of said first record within said second set,
      (i) identifying said first record of said second set as containing an entry matching said search value only if W is equal to 1; and (ii) if W is not equal to 1, setting W equal to a number of records within said second set and repeating steps (c)–(g) until a record containing an entry matching said search value is identified; and (h) thereafter, retrieving contents of at least one entry from said identified record and processing said contents of said at least one entry within said at least one processor.

2. The method of claim 1, said method further comprising: following step (f), searching said record containing said entry matching said search value to determine which entry within said record matches said search value.

3. A data processing system, comprising:

at least one processor;

data storage coupled to said at least one processor, said data storage containing an array including N records, wherein each of said N records includes at least a first entry and entries within all of said N records are ordered according to a value of said entries; and a search program residing in data storage and executable by said at least one processor, said search program including:

(a) means for setting W, a number of said N records within said array to be searched, equal to N;

(b) means for assigning each of said W records to either a first set or a second set, wherein records within each of said first set and said second set are sequentially ordered, said first set including X/2 of said W records, where X is a smallest power of 2 equal to or greater than W;

(c) means for determining whether said search value precedes, matches, or follows a first entry within a first record within said second set;

(d) means, responsive to a determination that said search value precedes said first entry of said first record within said second set, for performing a binary search of records within said first set of records to identify a record including an entry having a value equal to said search value;

(e) means, responsive to a determination that said value of said first entry within said first record within said second set is equal to said search value, for returning said first record within said second set as containing an entry matching said search value; and (f) means, responsive to a determination that said search value follows said first entry of said first record within said second set, for (i) returning said first record of said second set as containing an entry matching said search value only if W is equal to 1 and for (ii) if W is not equal to 1, setting W equal to a number of records within said second set and utilizing means (b)–(f) to search said second set until a record containing an entry matching said search value is identified.

4. The data processing system of claim 3, said search program further comprising:

means for thereafter searching said record containing said entry matching said search value to determine which entry within said record matches said search value.

5. A program product for causing a data processing system to search an array within its data storage, wherein the array includes N records that each include at least a first entry and wherein entries within all of said N records are ordered according to a value of said entries, said program product comprising:

(a) instruction means for causing the data processing system to set W, a number of said N records within said array to be searched, equal to N;

(b) instruction means for causing the data processing system to assign each of said W records to either a first set or a second set, wherein records within each of said first set and said second set are sequentially ordered, said first set including X/2 of said W records, where X is a smallest power of 2 equal to or greater than W;

(c) instruction means for causing the data processing system to determine whether a search value precedes, matches, or follows a first entry within a first record within said second set;

(d) instruction means, responsive to a determination that said search value precedes said first entry of said first record within said second set, for causing the data processing system to perform a binary search of records within said first set of records to identify a record including an entry having a value equal to said search value;

(e) instruction means, responsive to a determination that said value of said first entry within said first record within said second set is equal to said search value, for causing the data processing system to identify said first record within said second set as containing an entry matching said search value; and (f) instruction means, responsive to a determination that said search value follows said first entry of said first record within said second set, for causing the data processing system to (i) identify said selected record as containing an entry matching said search value only if W is equal to 1, and to (ii) if W is not equal to 1, set W equal to a number of records within said second set and utilize instruction means (b)–(f) to search said second set until a record containing an entry matching said search value is identified;

(g) instruction means for returning said identified record; and (h) a computer usable medium in which instruction means (a)–(g) are encoded.

6. The program product of claim 5, and further comprising:

instruction means for thereafter causing the data processing system to search said record containing said entry matching said search value to determine which entry within said record matches said search value.

7. The method of claim 1, wherein processing said at least one entry within said at least one processor comprises utilizing contents of said at least one entry of said identified record as an address to access a file within said data storage.

8. The data processing system of claim 3, said search program further comprising means for retrieving contents of at least one entry from said identified record and processing said contents of said at least one entry within said at least one processor.

9. The data processing system of claim 8, wherein said means for processing said at least one entry within said at least one processor comprises means for accessing a file within said data storage utilizing contents of said at least one entry of said identified record as an address.

10. The program product of claim 5, said program product further comprising instruction means for causing said data processing system to retrieve contents of at least one entry from said identified record and process said contents of said at least one entry within at least one processor.

11. The program product of claim 10, wherein said instruction means for causing said data processing system to process said at least one entry comprises instruction means for causing said data processing system to access a file within said data storage utilizing contents of said at least one entry of said identified record as an address.

* * * * *